(12) United States Patent
Fischer et al.

(10) Patent No.: US 7,482,396 B2
(45) Date of Patent: *Jan. 27, 2009

(54) STORABLE MOLDABLE MATERIAL AND FLAT ARTICLES PRODUCED FROM RENEWABLE RAW MATERIALS

(75) Inventors: Bernd Fischer, Aspach (DE); Heiko Hamann, Freudental (DE); Hans-Jörg Mauk, Mundelsheim (DE); Miko Ess, Freiburg (DE); Bernd Kastl, Bietigheim-Bissingen (DE)

(73) Assignee: DLW Aktiengesellschaft (DE)

( * ) Notice: Subject to any disclaimer, the term of this patent is extended or adjusted under 35 U.S.C. 154(b) by 716 days.

This patent is subject to a terminal disclaimer.

(21) Appl. No.: 10/989,176

(22) Filed: Nov. 15, 2004

(65) Prior Publication Data

US 2005/0089690 A1    Apr. 28, 2005

Related U.S. Application Data

(62) Division of application No. 10/031,217, filed as application No. PCT/EP00/06573 on Jul. 11, 2000, now Pat. No. 6,822,055.

(30) Foreign Application Priority Data

Jul. 21, 1999    (DE)    ................. 199 34 036

(51) Int. Cl.
C08K 3/22        (2006.01)
C08G 59/34       (2006.01)
C08G 59/42       (2006.01)

(52) U.S. Cl. .................. 523/457; 523/448; 523/458; 523/466; 525/438; 525/533

(58) Field of Classification Search ................ None
See application file for complete search history.

(56) References Cited

U.S. PATENT DOCUMENTS

| 4,694,033 | A | 9/1987 | van der Linde |
| 5,179,149 | A | 1/1993 | Hover et al. |
| 6,150,436 | A | 11/2000 | Kastl et al. |
| 6,248,405 | B1 * | 6/2001 | Kastl et al. ................... 427/411 |
| 6,946,541 | B2 * | 9/2005 | Ess et al. ..................... 528/365 |

FOREIGN PATENT DOCUMENTS

| DE | 19757591 A1 | 7/1998 |
| EP | 0377258 A1 | 7/1990 |
| EP | 0539916 A1 | 5/1993 |
| JP | 11140160 A | 5/1999 |
| WO | WO 98/28356 A1 * | 7/1998 |
| WO | WO 98/40427 A1 * | 9/1998 |

* cited by examiner

Primary Examiner—Robert Sellers
(74) Attorney, Agent, or Firm—Womble Carlyle Sandridge & Rice, PLLC

(57) ABSTRACT

The present invention relates to a method for producing a flat article comprising a material that contains the products of several reactions. The method comprises the following steps: carrying out a pre-cross-linking of a mixture comprising an epoxydation product of a carboxylic acid ester using at least one cross-linking agent in order to form a mouldable material; moulding the mouldable material in the shape of a flat article; and curing the moulded material in order to produce a flat article, wherein the pre-cross-linking reaction is separate from the curing reaction. This invention also relates to a mouldable material that can be stored and to a flat article that can be obtained from the same.

13 Claims, No Drawings

STORABLE MOLDABLE MATERIAL AND FLAT ARTICLES PRODUCED FROM RENEWABLE RAW MATERIALS

CROSS REFERENCE TO RELATED APPLICATION

This application is a Divisional application of, and claims priority to, U.S. patent application Ser. No. 10/031,217 filed on Apr. 18, 2002, now U.S. Pat. No. 6,822,055, which is a 371 of PCT/EP00/06573, filed Jul. 11, 2000, each of which is incorporated by reference in its entirety.

The present invention relates to a method for producing a flat article comprising a material that contains polyreaction products. The method comprises the following steps: carrying out pre-crosslinking of a mixture comprising an epoxidation product of at least one carboxylic acid ester using at least one crosslinking agent to form a moldable material; molding the moldable material in the shape of a flat article; and curing the molded material to produce a flat article, wherein the pre-crosslinking reaction is separate from the curing reaction. The invention further relates to a moldable material that can be stored and to a flat article that can be obtained therefrom.

Linoleum has long been known as a resilient floor covering based on renewable raw materials. Because of its natural constituents, linoleum has achieved great importance based on its biological suitability for use in construction as well as environmental considerations. However, in the production of linoleum coverings the last step of the process requires a heat treatment, the so-called "ripening time," that lasts several weeks. Although measures have been undertaken in the prior art to shorten this ripening time and thus achieve higher productivity, continuous methods for producing linoleum flooring are thus far unknown in the art.

For this reason flat articles, based on renewable raw materials, that are composed of other materials have been described in the prior art. German Patent 22 41 535, for example, describes a coating material for flat textile articles based on epoxidation products of esters of unsaturated fatty acids and polyvalent aliphatic alcohols.

However, the epoxidized oils and fatty acids used in such a method are liquid in the unprocessed state, with the result that flat articles cannot be molded from said substances in the raw state. Thus, in the production of flat articles from such a material it is common to carry out pre-crosslinking of the oils and/or fatty acids to give a highly viscous, moldable intermediate product (prepolymer). After molding into flat articles, a second crosslinking step is then carried out to give a usable material (final crosslinking). Termination of the first crosslinking step is problematic. In principle, a two-step reaction can be carried out in the following manner:

(I) Pre-crosslinking in which one of the crosslinking components is present in deficit (epoxidation product or crosslinking agent). Full crosslinking is carried out with addition of the component present in deficit.

(II) Different temperatures in the individual process steps.

(III) Use of separate crosslinking agents having different reactivities.

(IV) Different mechanisms in both process steps.

International Patent WO 90/107607 describes a method in "two reaction phases," whereby in the first reaction phase a mixture of a stand oil with fillers is homogenized, then partially polymerized and partially crosslinked at elevated temperatures, using a peroxide, to give an intermediate product. The powdered intermediate product is then homogenized with an elastomeric natural or synthetic material, fillers, and a peroxide, and is again crosslinked and polymerized at elevated temperature.

Coating materials that are based on renewable raw materials and used for coating flat textile articles or release paper are known from German Patent Application 41 35 664. The coating materials are composed of a combination of epoxidation products of esters of unsaturated fatty acids and partial esters of polycarboxylic acids with polyether polyols in addition to a hydrophobing agent. These coating materials are used for the production of floor coverings. It is disadvantageous, however, that the top layer of coverings produced in this way is very rough and non-transparent. Furthermore, the surface of these coverings is not sufficiently soil-repellent and exhibits poor through-hardening.

Spreadable coating materials for the production of flat articles based on renewable raw materials are known from International Patent WO 96/15203. However, due to the use of so-called "coating pastes" contained in the coating materials, the production of said flat articles is limited to coating methods.

International Patent WO 98/28356 describes a method for producing flat articles based on renewable raw materials, in which flat articles with satisfactory material properties can be obtained by pressing, calendering, or extruding. An intermediate product that can be stored (prepolymer) is obtained, however, only if either the crosslinking agent or the epoxidation product is present in deficit. The prepolymer is converted to the fully crosslinked material in the second crosslinking step by addition of the component that is present in deficit. This method has the disadvantage that a considerable portion of the component first added in deficit must be compounded into the already viscous, pre-crosslinked material.

Since the reactions underlying pre-crosslinking and final crosslinking in the prior art are always based on the same reaction mechanism, it is difficult to obtain a further processable, storable intermediate product by timely termination of pre-crosslinking or by use of a component in deficit.

The object of the present invention, therefore, is to provide a novel method for producing a flat article from renewable raw materials in which essentially no ripening time is necessary and in which the rate of pre-crosslinking can be better regulated. A further object is that the pre-crosslinked intermediate product has a practically unlimited storage life.

This object is achieved by the embodiments characterized in the claims.

In particular, a method for producing a flat article comprising a material that contains polyreaction products is provided which comprises the following steps:

(1) Compouding of an epoxidation product of at least one carboxylic acid ester using at least one crosslinking agent, (2) Pre-crosslinking or partial crosslinking of the mixture obtained in step (1) to form a moldable material, (3) Molding of the moldable material obtained in step (2) in the shape of a flat article, and (4) Curing, further crosslinking, or final crosslinking of the molded material to produce the flat article, wherein the pre-crosslinking reaction in step (2) is separate from the curing reaction in step (4).

The present invention is based on the knowledge that the disadvantages of known methods of the prior art can be avoided by having separate chemical reactions or chemical reaction mechanisms for pre-crosslinking and for curing. To this end, at least two different reactions I and II occur in the mixture obtained by compounding (1), for example by the presence of at least two crosslinkable groups A and B. For pre-crosslinking in step (2), essentially only one reaction I proceeds, for example by reaction of only one crosslinkable group A, that is, a class of similar crosslinkable groups. Reaction II, which is different from reaction I, does not proceed significantly under the reaction conditions for pre-crosslinking. For example, group B, which is different from A, is essentially stable or inert under the reaction conditions for pre-crosslinking, and in this step is practically unreacted. Reaction I, for example, halts after the consumption—that is, the essentially complete reaction—of group A to produce the moldable material. Furthermore, a suitable agent can be used to terminate reaction I after a desired reaction rate is achieved to produce the moldable material.

According to the invention, the second crosslinking step, that is, reaction II—the reaction of group B, for example—is initiated or started only by modification of the reaction conditions. In the context of the present invention, "modification of the reaction conditions" means an elevation in temperature or an increase or decrease in pressure, addition of reaction-initiating agents such as radical-forming initiators, and/or exposure of the mixture obtained in step (1) or the partially crosslinked material obtained by pre-crosslinking (2) to radiation, such as UV, electron beam, or IR radiation.

For example, pre-crosslinking (2) can be carried out at a relatively low temperature $T_1$, optionally with radiation, at which reaction I proceeds, and group A, for example, is at least partially reacted, for example by esterification or etherification or a condensation, substitution, or addition reaction, optionally associated with a ring opening. At this temperature $T_1$, reaction II does not proceed to a significant extent, and there is practically no conversion of group B, for example. For final crosslinking, at a specified time the moldable material can be heated to a higher temperature $T_2$ at which reaction II, for example a radical crosslinking of group B, is initiated, such as by decomposition of a heat-sensitive group B itself or by a radical initiator that decomposes only at a temperature $T_2$. In addition, the mixture obtained in step (1) during pre-crosslinking (2) can be exposed to radiation, for example UV radiation, which has brought about reaction I, for example crosslinking of group A. In contrast, crosslinking of group B is initiated only by an increase in temperature or another type of radiation such as IR or electron beam radiation or UV radiation at another wavelength, during final crosslinking (4). Also, the addition of, for example, radical- or ion-forming initiators or exposure to an atmosphere containing a reactive gas such as oxygen can be understood as modification of the reaction conditions according to the invention.

A major advantage of the present invention, therefore, is that in a preferred embodiment the pre-crosslinking automatically terminates after reaction of the first crosslinkable groups is complete, and as a rule, appreciable crosslinking by the second crosslinkable groups beyond a moldable product does not occur in this step.

The epoxidation product of at least one carboxylic acid ester is preferably the epoxidation product of one or several esters of unsaturated fatty acids, preferably an epoxidized natural triglyceride or a derivative thereof. Epoxidized linseed oil, epoxidized soybean oil, epoxidized castor oil, epoxidized rapeseed oil, or vernonia oil or a mixture containing at least two of these epoxidation products can be used, for example. In one embodiment these epoxidation products are only partially epoxidized; that is, in addition to epoxidized double bonds there remain unreacted double bonds in the carboxylic acid ester. The alcohol component of these carboxylic acid esters is not subject to any particular limitation. Dipropylene glycol, propanediols, butanediols, hexanediols, hexanetriols, glycerin, or pentaerythritol are examples of alcohol components that can be used. The carboxyl component is not subject to any particular limitation.

According to the present invention, the mixture obtained in step (1) is crosslinked in two crosslinking steps (2) and (4). In the first crosslinking step (2) a moldable intermediate product that can be stored is produced from liquid raw materials, for example. This crosslinking step (2) can be carried out after the compounding step (1) as well as simultaneously with the compounding step (1). After molding (3) in the shape of a flat article, the intermediate product acquires its final functional properties through curing and the second crosslinking step (4).

Furthermore, according to the invention the pre-crosslinking reaction is separate from the curing reaction. For example, when partially epoxidized carboxylic acid esters of unsaturated fatty acids are used in a first crosslinking step, the epoxy groups are preferably completely reacted, and in a second crosslinking step the remaining unsaturated double bonds are crosslinked by radical polymerization, for example. In particular, the second crosslinking step can be carried out using essentially completely epoxidized carboxylic acid esters via radical hydrogen abstraction of the pre-crosslinked material, and recombination.

Reaction of the epoxy groups preferably is carried out with at least bifunctional compounds, so-called "crosslinking agents," for example by nucleophilic attack and addition to the epoxy group.

According to the present invention, the term "crosslinking" encompasses an increase in molar mass or molecular size. For example, the term "crosslinking" is associated with an increase in viscosity of the moldable material in comparison to the mixture obtained in step (1).

According to one embodiment of the present invention, so-called "acid crosslinking agents," that is, di- or polycarboxylic acids or derivatives thereof, are used as reactants in such a reaction. In one embodiment, such di- or polycarboxylic acids or derivatives thereof contain at least one double bond per molecule. Maleic acid, itaconic acid, fumaric acid, succinic acid, methylsuccinic acid, malic acid, phthalic acid, tartaric acid, citraconic acid, furandicarboxylic acid, or a mixture of at least two of said acids are preferably used as dicarboxylic acids. Acids containing three or more carboxylic acid groups, such as citric acid, aconitic acid, and trimellitic acid, are preferably used as polycarboxylic acids.

Anhydrides or partial esters or derivatives having at least one free carboxylic acid group can be used as derivatives of di- or polycarboxylic acids. The alcohol component of the partial esters is not subject to any particular limitation; however, polyols such as dipropylene glycol, propanediols, butanediols, hexanediols, hexanetriols, glycerin, or pentaerythritol are preferably used as the alcohol component.

In one embodiment, a mixture of a partial ester of maleic acid anhydride and dipropylene glycol together with citric acid as crosslinking agent is used, where the amount of citric acid is less than or equal to 50 wt %, preferably less than or equal to 25 wt %, relative to the total quantity of crosslinking agent.

Moreover, the crosslinkable groups required for curing (4) may be introduced via the crosslinking agent.

The reaction of the epoxidation product with the crosslinking agent is preferably induced thermally and/or by radiation. In the case of thermal induction, the reaction is carried out, for example, at a temperature ranging from room temperature to 280° C., preferably from room temperature to 200° C., in particular to a temperature of 150° C. UV radiation, electron beam radiation, and/or IR radiation may be used as the reaction-inducing radiation.

A reaction induced by UV radiation should be carried out in the presence of at least one UV initiator, and with electron beam radiation the addition of at least one UV initiator may be omitted. The UV initiators that may be used according to the invention can be radical or cationic UV initiators or a mixture of these types of UV initiators. Preferred examples of radical UV initiators include benzophenone, benzophenone derivatives, phosphine oxides, α-morpholinoketones, quinone, quinone derivatives, α-hydroxyketones, or mixtures thereof. Preferred examples of cationic UV initiators include triarylsulfonium salts, which can be present as one type or as a mixture of different triarylsulfonium salts, or diaryliodonium salts or mixtures thereof. The UV- initiators are present, for example, in quantities of less than or equal to 15 wt %, preferably 0.05 to 8 wt %, relative to the quantity of the material containing polyreaction products.

In one embodiment according to the invention, in addition to the UV initiator at least one photosensitizer, such as a compound based on anthracene, perylene, or thioxanthene-9-one, is present which activates the UV initiator and which can intensify the effect thereof. The concentration of the UV initiator can thus be reduced. UV radiation used according to the invention lies in a generally common range, that is, between 200 nm and 380 nm. IR radiation used according to the invention lies in a generally common range, for example between 760 nm and 0.5 mm.

The material containing polyreaction products preferably comprises 10 to 99 wt % binders relative to the total quantity of the material containing polyreaction products. The term "binder" encompasses the crosslinking monomer and prepolymer components as well as crosslinking agents. In the mixture obtained in step (1), the respective weight quantities of the crosslinking agent and the epoxidation product are preferably 5 to 80 wt %, relative to the total quantity of the material containing polyreaction products.

Furthermore, in compounding step (1) additional additives or components, such as fillers, titanium dioxide, pigments for embossing, hydrophobing agents, auxiliary agents, and possibly co-crosslinking agents such as triallylisocyanurate, triallylcyanurate, ethylene glycol dimethacrylate, trimethylolpropane-trimethacrylate, and m-phenylene- bis-maleinimide may be admixed. The fillers are preferably wood dust, chalk, cork powder, barium sulfate, silicic acid, kaolin, quartz-kaolinite mixture, talc, glass, textile fibers, glass fibers, plant fibers, cellulose fibers, or polyester fibers, and nanoscale "intelligent" fillers such as organically modified bentonites. Examples of auxiliary agents that may be used include tall oils, synthetic or natural resins such as balsamic resins, copal resins, or hydrocarbon resins, and/or desiccants such as compounds of the metals Al, Li, Ca, Ba, Fe, Mg, Mn, Pb, Zn, Zr, Ce, Sn, or Co, or a combination containing at least two of these compounds.

As a result of pre-crosslinking (2) of the partially liquid components, the intermediate product formed has a specific pre-crosslinking rate and quasi-thermoplastic properties and is therefore moldable. Since reaction I, for example the reaction of the first crosslinkable groups A, proceeds essentially to completion and curing according to the invention can be performed only by modifying the reaction conditions by initiating reaction II, for example by crosslinking of second crosslinkable groups B, the moldable intermediate product surprisingly has a practically unlimited storage life. The partially cured material can be comminuted (granulated or powdered) after the pre-crosslinking step (2), and can be stored in powdered form, for example.

The term "moldable material" applied to an intermediate product in this context means an essentially liquid reaction product as well as a highly viscous reaction product as binder. According to the present invention, the crosslinking rate of the pre-crosslinked moldable material obtained in step (2) is less than the crosslinking rate of the material containing polyreaction products in the form of a flat article obtained after curing (4).

The crosslinking rate of the moldable material can be controlled by the ratio of the number of first crosslinkable groups to the number of second crosslinkable groups, without significantly influencing the overall number of crosslinking groups and thus the crosslinking rate of the end product. If the relative number of first crosslinkable groups is relatively small, a rather low-viscosity moldable material is obtained as the intermediate product. If the relative number of first crosslinkable groups is larger, an intermediate product with a more solid consistency is obtained which can be processed as a granulate or powder, for example. In the case of epoxidation products of carboxylic acid esters of unsaturated fatty acids, the ratio of epoxy groups to unsaturated double bonds can be controlled, for example, by the epoxidation rate or via hydrogen abstraction by the peroxide dosage during crosslinking.

In addition, the consistency of the moldable material obtained in step (2) is influenced by whether a bifunctional or trifunctional crosslinking agent, for example, is used. Of course, the consistency also depends on the type and quantity of additional components compounded, such as fillers, for example.

An advantage of the method according to the invention, therefore, is that the moldable pre-crosslinked material obtained in step (2) can be processed into a flat article using common methods such as pressing, calendering, or extruding.

Molding (3) of the compounded material can be carried out before curing (4) or simultaneously with curing (4). The pre-crosslinked material can be shaped in customary processing machines such as presses, double band presses, calenders, adaptive universal multiple access (AUMA) facilities, or thermoset machines, or by extruders with slot dies. for example. In addition, for embossing, differently colored chips or granules of an otherwise practically identical material can be interspersed in the material web obtained, whereupon the web can be given its final shape in a calender, AUMA facility, or thermoset machine, etc., for example.

Furthermore, an embossing method can be used in which, before curing (4), a patterned or printed absorbent material is applied to the material molded as a flat article. To avoid stresses in the flat article, material of the same type, which optionally is printed, may optionally be applied to the reverse side as a countermeasure. The absorbent material is preferably a cellulose non-woven fabric made of reclaimed cellulose fibers having a high specific surface, for example, which is characterized by high absorptivity, high dry and wet strengths, and low shrinkage. The weight per unit area of such cellulose non-woven fabrics ranges from 25 to 50 g/m$^2$, for example. During subsequent pressing, a portion of the not yet fully crosslinked binder according to the invention penetrates the absorbent material and forms a thin top layer or wear layer after curing, which optionally can be lacquered by customary methods on the top side of the flat article embossed in such a manner. The top layer or wear layer of the patterned or printed material is thereby protected from abrasion.

One advantage of such a one-step embossing method is that a flat article constructed from the material defined above may be imprinted as desired, which for flat articles made of linoleum, for example, is not applicable.

According to the present invention, the intermediate product can be further crosslinked and cured in a second crosslinking step, either after or simultaneously with molding. Curing (4) may be performed by common methods such as pressing, for example by using a jaw press, AUMA facility, double band press, or calendering method, by simple passage through a heated channel, or by a combination of these methods, optionally at elevated temperature.

According to one embodiment, curing (4) can be performed by peroxidic crosslinking via radical hydrogen abstraction. In this reaction, a radical initiator is added that decomposes to form radicals. Each radical created directly or in a consecutive reaction can remove one hydrogen from the pre-crosslinked material, thereby becoming saturated. A radical site is simultaneously formed on a macromolecule of the pre-crosslinked material. Two macromolecular radicals formed in this manner can join to form a new C—C bond. Multiple repetitions of this process on the pre-crosslinked material results in the final crosslinked material containing polyreaction products. The speed of this reaction is determined by the peroxide decomposition rate. Because such peroxidic crosslinking proceeds stoichiometrically and not as a chain reaction, the rate of final crosslinking can be controlled by the peroxide dosage. The amount of peroxide required depends on the desired end properties of the material containing polyreaction products, the type of peroxide, the form of delivery, and the type and quantity of the additional additives. Preferably, 0.05 to 10 wt % peroxide, in particular 0.5 to 10 wt %, relative to the weight of the binder, is used. Preferred peroxides include acyl peroxide, perketals, and aryl, alkyl, and aralkyl peroxides, or peroxides that release aroyl, phenyl, alkoxy, aralkoxy, or primary alkyl radicals.

Dicumyl peroxide, tert-butylcumyl peroxide, di(2-tert-butylperoxyisopropyl)benzene, di(tert-butyl)peroxide, 1,1-di(tert-butylperoxy)-3,3,5-trimethylcyclohexane, 2,5-bis(tert-butylperoxy)-2,5-dimethylhexane, and 2,5-bis(tert-butylperoxy)-2,5-dimethylhexyne(3), for example, are particularly preferred. In addition, crosslinking can be carried out with the addition of sulfur or silicon compounds singly or in combination with the peroxides listed above. The peroxide decomposition reaction can be induced thermally as well as by radiation, for example by UV radiation. This reaction is preferably thermally initiated. If the peroxides are already contained in the mixture, prior to the actual crosslinking the pre-crosslinked material should not be heated above a temperature at which little or no crosslinking is observed within the typical reaction time (so-called "scorch temperature").

According to a further embodiment, the curing reaction comprises a radical crosslinking of the free double bonds of the partially epoxidized carboxylic acid ester or of the double bonds of the crosslinking agent. In particular, organic peroxides commonly used as radical initiators or azobis compounds in customary forms of use can be used as radical-forming initiators or starters for curing (4). Examples of such include hydroperoxides such as cumene hydroperoxide and t-butylhydroperoxide, peroxyesters such as t-butylperoxybenzoate, t-butylperoxy-3,5,5-trimethylhexanoate, t-butylperoctoate, and dimyristylperoxydicarbonate, peroxyketals such as 1,1-bis(t-butylperoxy)-3,3,5-trimethylcyclohexane and 1,1-bis(t-butylperoxy)cyclohexane, dialkylperazides and diaralkylperoxides such as di-t-amyl peroxide, dicumyl peroxide, and 2,5-bis(t-butylperoxy)-2,5-dimethylhexane and -hexyne(3), and azobis compounds such as 2,2'-azobis(2-acetoxypropane) and 2,2'-azo-bis(2-methylpropionitrile).

The radical chain reaction can be initiated thermally as well as by radiation, by UV radiation, for example.

The radical-forming initiator is preferably admixed with the other components in the form of a mixture with a mineral oil. Such a mineral oil acts as a wetting agent for the granulate and can simultaneously have a desensitizing effect.

The radical-forming initiator can optionally be compounded with the other components of the material in the compounding step (1) and/or before pre-crosslinking (2) and/or before molding of the flat article (3) in a second optional compounding step, or the radical-forming initiator can be incorporated by compounding before both crosslinking steps. Before shaping onto the surface of the appropriate material is performed, the radical-forming initiator, for example one of the aforementioned peroxides, can also be applied substantially to the surface by spraying, for example. Peroxides with different half lives and/or decomposition temperatures may optionally be added, so that, for example, decomposition of the peroxide required in the second crosslinking step (4) for curing does not occur during the first crosslinking step (2) of the method according to the invention.

Compounding (1) of the components is preferably carried out in an extruder or mixer. Furthermore, the method according to the invention may optionally include a second compounding step, such as the addition of peroxide, before molding of the flat article.

Surprisingly, the flat articles obtained by the method according to the invention are crosslinked throughout their entire cross section without further ripening, are non-tacky and flexible, and have a high bend restoring force; that is, they can be used directly after production. Hence, omission of the ripening process enables the method according to the invention to be carried out continuously.

The method according to the invention may optionally include an embossing step for the cured flat article, using the thermal transfer printing method, for example, known in the art.

The present invention further relates to a moldable, storable material that can be obtained through steps (1) and (2) of the method according to the invention.

This intermediate product has the composition described above.

The invention further relates to a flat article that can be obtained from the moldable, storable material according to the invention by molding and curing.

The flat articles produced by the method according to the invention are preferably used as floor or wall coverings. The flat articles can be present in a homogeneous form, or the pre-crosslinked material can be applied onto a substrate such as glass fiber mat, cardboard, jute fabric, or a substrate based on jute, such as mixtures of jute mat and polypropylene/polyester non-woven fabric.

The following example explains the present invention in more detail.

EXAMPLE

| Formulation: | 41.0 wt % | epoxidized natural triglyceride |
|---|---|---|
| | 8.2 wt % | acid crosslinking agent |
| | 41.0 wt % | filler |
| | 8.2 wt % | white pigment |
| | 1.6 wt % | peroxide/mineral oil mixture (1:2) |

Procedure:

The solid materials were weighed together and mixed. In a parallel procedure the peroxide/mineral oil mixture was added to the epoxidized natural triglyceride and admixed. Both mixtures were then purified and homogenized over a period of 5 minutes in a laboratory dissolver. Curing was then carried out in a first stage in a metering mixer over a period of 25 minutes at 160° C. The still moldable material thus obtained was formed into pressed plates in a hydraulic two-jaw press, using a metal frame 1.5 mm thick having a surface area of 169 cm², and silicone separating tissue. The stamping pressure of the press was approximately 30 bar, the jaw temperature was 200°C., and the crosslinking time was 15 minutes.

The plates thus obtained were crosslinked throughout their entire cross section, were non-tacky and flexible, and had a high bend restoring force.

The invention claimed is:

1. A storable moldable material obtained by a method comprising the following steps:
    (1) Compounding of an epoxidation product of at least one carboxylic acid ester using at least one crosslinking agent, wherein an epoxidized carboxylic acid ester of unsaturated fatty acids is used as the epoxidation product, wherein the epoxidation products are only partially epoxidized to the extent that there remains unreacted double bonds, wherein a di- or polycarboxylic acid, a derivative thereof, or a mixture containing at least two different crosslinking agents is used as the crosslinking agent, and
    (2) Pre-crosslinking of the mixture obtained in step (1) to form the storable moldable material by completely reacting the epoxy groups of the epoxidation product with the crosslinking agent(s).

2. The storable moldable material according to claim 1, wherein epoxidized linseed oil, epoxidized soybean oil, epoxidized castor oil, epoxidized rapeseed oil, vernonia oil or a mixture thereof containing at least two different epoxidation products is used as the epoxidation product.

3. The storable moldable material according to claim 1, wherein maleic acid, itaconic acid, fumaric acid, succinic acid, methylsuccinic acid, malic acid, phthalic acid, tartaric acid, citraconic acid, furandicarboxylic acid, or a mixture of at least two of said acids is used as the dicarboxylic acid.

4. The storable moldable material according to claim 1, wherein citric acid, trimellitic acid, or aconitic acid is used as the polycarboxylic acid.

5. The storable moldable material according to claim 1, wherein an anhydride or partial ester is used as the derivative of a di- or polycarboxylic acid.

6. The storable moldable material according to claim 1, wherein the reaction of the epoxidation product with the crosslinking agent is induced thermally, by radiation, or a combination thereof.

7. The storable moldable material according to claim 6, wherein the reaction induced by radiation is carried out by using UV radiation in the presence of at least one UV initiator, by using electron beam radiation optionally in the presence of at least one UV initiator, and/or by using IR radiation, or a combination thereof.

8. The storable moldable material according to claim 1, wherein the components compounded in step 1 further comprise at least one additional additive from the group comprising fillers, pigments, and auxiliary agents.

9. The storable moldable material according to claim 8, wherein the auxiliary agents are selected from tall oils, synthetic resins, natural resins, balsamic resins, copal resins, hydrocarbon resins, desiccants, or combinations thereof.

10. The storable moldable material according to claim 8, wherein the fillers are selected from wood dust, chalk, cork powder, barium sulfate, silicic acid, kaolin, quartz-kaolinite mixture, talc, glass, textile fibers, glass fibers, plant fibers, cellulose fibers, polyester fibers, nanoscale "intelligent" fillers, or organically modified bentonites.

11. The storable moldable material according to claim 1, wherein the method further comprises the following step:
    (3) Compounding the storable moldable material with at least one additional additive from the group comprising fillers, pigments, and auxiliary agents.

12. The storable moldable material according to claim 11, wherein the auxiliary agents are selected from tall oils, synthetic resins, natural resins, balsamic resins, copal resins, hydrocarbon resins, desiccants, or combinations thereof.

13. The storable moldable material according to claim 11, wherein the fillers are selected from wood dust, chalk, cork powder, barium sulfate, silicic acid, kaolin, quartz-kaolinite mixture, talc, glass, textile fibers, glass fibers, plant fibers, cellulose fibers, polyester fibers, nanoscale "intelligent" fillers, or organically modified bentonites.

* * * * *